United States Patent [19]

Savin et al.

[11] 4,236,966
[45] Dec. 2, 1980

[54] NUCLEAR REACTOR

[76] Inventors: Nikolai I. Savin, ulitsa Zvezdinka, 3, kv. 71; Dmitry A. Khramov, ulitsa Kultury, 3, kv. 425; Vladimir J. Filippov, ulitsa Piskunova, 32, kv. 14; Valery V. Bugrov, ulitsa Kirova, 22, kv. 57, all of Gorky, U.S.S.R.

[21] Appl. No.: 840,396

[22] Filed: Oct. 7, 1977

[51] Int. Cl.$^3$ .................. G21C 19/20; B66C 17/08; B66C 1/10
[52] U.S. Cl. .................. 176/30; 294/86 A; 414/146
[58] Field of Search .............. 176/30, 81, 75, 78, 176/79; 214/18 N; 294/86 A; 414/146

[56] References Cited

U.S. PATENT DOCUMENTS

| | | | |
|---|---|---|---|
| 3,138,535 | 6/1964 | Fortescue | 176/30 |
| 3,711,369 | 1/1973 | Pugh | 176/30 |
| 3,713,973 | 1/1973 | Normand | 176/30 |

FOREIGN PATENT DOCUMENTS

| | | | |
|---|---|---|---|
| 1581073 | 9/1969 | France | 176/30 |
| 1273977 | 5/1972 | United Kingdom | 176/30 |

*Primary Examiner*—Samuel W. Engle
*Assistant Examiner*—Donald P. Walsh
*Attorney, Agent, or Firm*—Fleit & Jacobson

[57] ABSTRACT

The proposed nuclear reactor comprises fuel assemblies whose heads are shaped as prisms and provided with an internal hollow for the working member of the gripping means to grip and handle the fuel assembly. The gripping means is accommodated in a guide member of a refuelling device having an end face shaped as a truncated cone whose vertex is directed towards the head of a fuel assembly being handled. Recesses are provided in the end faces of the fuel assembly heads. The number of recesses is equal to that of fuel assemblies adjacent to the fuel assembly being handled. The recesses are arranged symmetrically with respect to the face edges of the fuel assembly heads. The sides of the recesses next to the recess which is adjacent to the recess of the fuel assembly being handled and facing the fuel assembly being handled all form parts of the surface of a truncated cone whose axis is matched with the longitudinal axis of the fuel assembly being handled. The diameter of the lesser base of the truncated cone of the guide member is greater than the diameter of the lesser base of the truncated cone partially formed by the sides of the recesses facing the fuel assembly being handled, but less than the diameter of its greater base.

1 Claim, 7 Drawing Figures

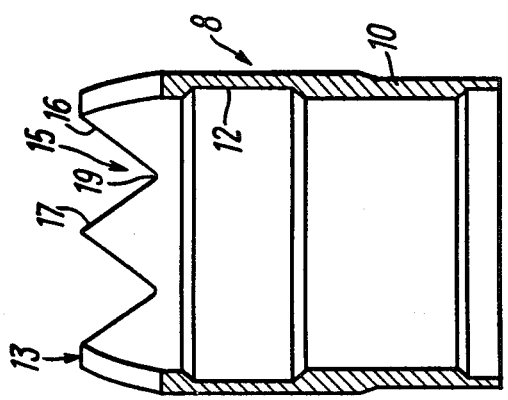
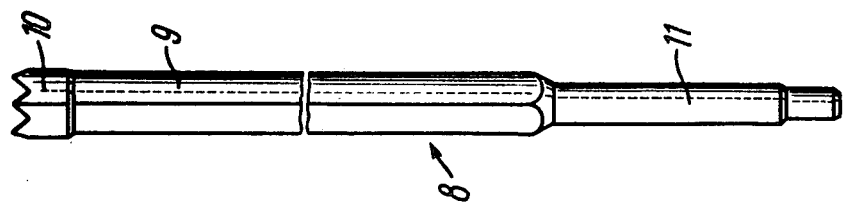
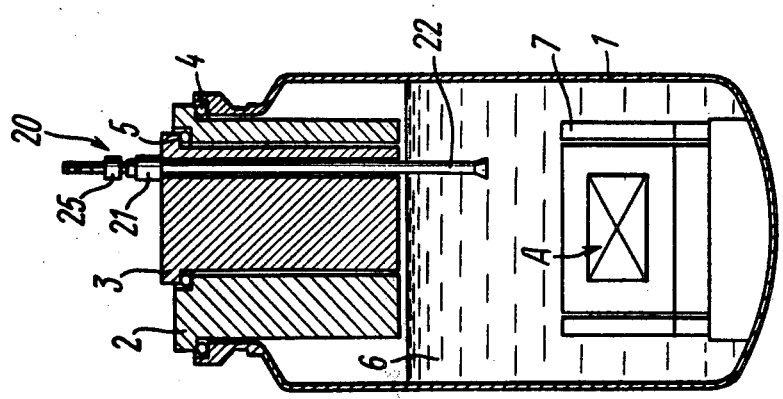

NUCLEAR REACTOR

The present invention relates to nuclear power plants and, more particularly, to nuclear reactors, primarily, to fast neutron reactors with a liquid-metal coolant.

There are known nuclear reactors of the type that comprises a core accomodating fuel assemblies, and a device for recharging fuel assemblies, having a gripping means movable with a fuel assembly being handled inside a guide tube mounted on the reactor's lid, the guide tube having an external shoulder at its base, intended to prevent the withdrawal of fuel assemblies adjacent to the one being handled.

In the nuclear reactor refuelling device of the foregoing type, the shape of the guide tube's shoulder is such that it prevents the fuel assemblies adjacent to the one being handled from being withdrawn together with the fuel assembly which is being removed from the reactor core. That, however, is the only positive effect of said shoulder. The design under review is disadvantageous in that it does not make it possible to move the fuel assemblies adjacent to the one being handled aside so as to facilitate the removal of the fuel assembly being handled. As a result, the replacement of fuel assemblies is a time- and labor-consuming operation.

The refuelling device under review needs a powerful drive, which accounts for an increased weight, size and cost of the refuelling device.

The above disadvantages are partially eliminated in a known nuclear reactor comprising a core which accomodates fuel assemblies having heads with an internal hollow for the working member of the gripping means of the fuel recharging device, which is arranged in the guide member of that device and has an end face shaped as a truncated cone whose vertex is directed towards the head of the fuel assembly being handled.

In order to center the fuel recharging device in relation to the fuel assembly being handled, the foregoing nuclear reactor is provided with a centering means mounted on the guide member and spaced at a distance equal to the fuel assembly spacing from the longitudinal axis of the gripping means; said centering means is shaped as a truncated cone.

In order to center the refuelling device with respect to the fuel assembly to be transferred, the guide cone of the centering means is received in the internal hollow of the fuel assembly head adjacent to the one which has to be handled, and the guide member is found in the spacing between the head of the fuel assembly being handled and the adjacent fuel assemblies until the cone at its end face comes into contact with the conical surfaces provided on the side surfaces of the heads of the fuel assemblies adjacent to the one being handled, whereby the adjacent fuel assemblies are moved aside and thus prevented from being withdrawn together with the fuel assembly being removed.

In the foregoing nuclear reactor, the cone-shaped guide member makes it possible to move aside the fuel assemblies adjacent to the one being handled, but does not reliably prevent said adjacent fuel assemblies from moving up with the spent fuel assembly being removed; this affects the operating reliability of the refuelling device and the nuclear reactor as a whole.

Besides, the conical surface provided on the side surface of the fuel assembly head accounts for a reduced diameter of the flow area for the coolant. The latter factor necessitates a reduced size of the gripping means' working member, whereby the latter's strength is affected, and also accounts for an increased hydraulic resistance of the fuel assembly.

In the above nuclear reactor, the working member of the gripping means is centered with respect to a fuel assembly to be handled with the aid of a single member which is a guide cone of the centering means; the fuel assemblies adjacent to the one being handled are moved aside and held in that position with the aid of another component, i.e. the guide member. The result is an unnecessarily complicated design of the nuclear reactor.

It is an object of the present invention to improve the reliability of the nuclear reactor.

It is another object of the invention to provide a nuclear reactor featuring a reduced hydraulic resistance of the fuel assembly.

The present invention essentially consists in providing a nuclear reactor whose core accomodates fuel assemblies having heads shaped as prisms and provided with an internal hollow for a working member of a gripping means of a fuel recharging device, arranged in a guide member of that device having an end face shaped as a truncated cone whose vertex is directed towards the head of a fuel assembly being handled, wherein according to the invention, the end faces of the faces of the fuel assemblies are provided with recesses whose number is equal to that of fuel assemblies adjacent to the one being handled, which are arranged symmetrically with respect to the edges of the faces of the fuel assembly heads, the sides of the recesses next to the recess which is adjacent to the recess of the fuel assembly being handled, facing the fuel assembly being handled, all forming parts of the surface of a truncated cone whose axis is matched with the longitudinal axis of the fuel assembly being handled, whereas the diameter of the lesser base of the truncated cone of the guide member is greater than the diameter of the lesser base of the truncated cone partially formed by the sides of the recesses facing the fuel assembly being handled, but less than the diameter of its greater base.

The foregoing nuclear reactor design is such that fuel assemblies adjacent to the one being handled are more reliably prevented from moving in the vertical direction together with the fuel assembly being handled. This improves the reliability of the refuelling device and the nuclear reactor as a whole. In addition, the proposed nuclear reactor design makes it possible to increase the flow area for the coolant, which, in turn, makes it possible to reduce the hydraulic resistance of the fuel assembly and use a tougher working member for the gripping means.

Other objects and advantages of the present invention will be more readily understood from the following detailed description of a preferred embodiment thereof to be read in conjunction with the accompanying drawings, wherein:

FIG. 1 is an elevation view of a nuclear reactor in accordance with the invention;

FIG. 3 is a general view of a fuel assembly of a nuclear reactor in accordance with the invention;

FIG. 4 is a magnified-scale elevation view of the head of the fuel assembly of FIG. 3;

Figure 2:
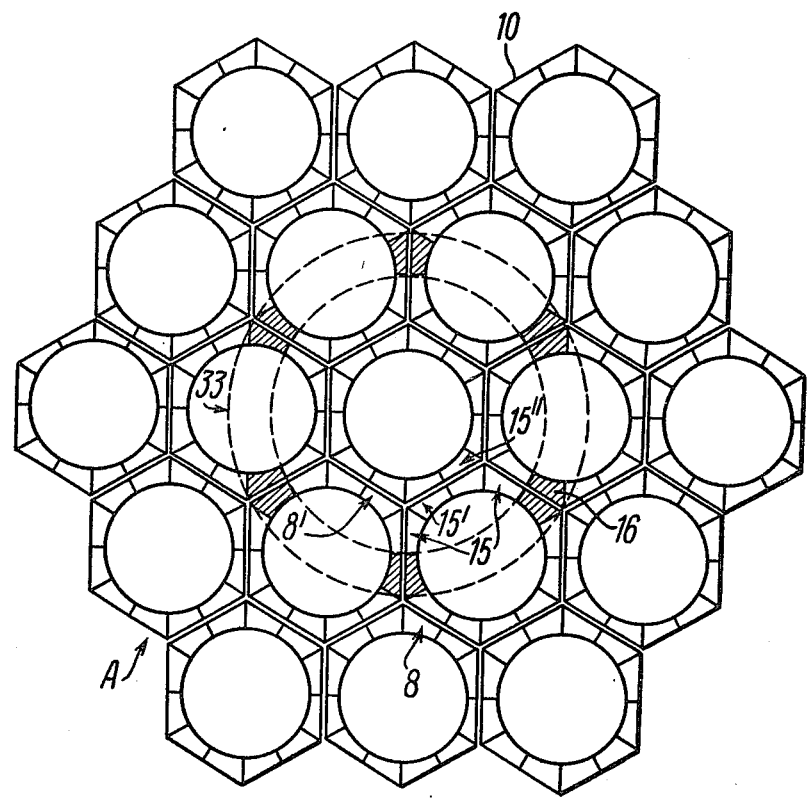
FIG. 2 is a magnified-scale plan view of fuel assemblies accomodated in the reactor core, in accordance with the invention.

The proposed nuclear reactor will be described with reference to a fast neutron reactor comprising a vessel 1 (FIG. 1) with rotating plugs 2 and 3 eccentrically arranged on the end face of the vessel 1. The plugs 2 and 3 are rotatable about their respective axes, being mounted on bearings 4 and 5. The plugs 2 and 3 provide the biological shielding. The vessel 1 is filled with a coolant 6. The vessel 1 accomodates a reactor core A and a storage 7. The core A and storage 7 accomodate fuel assemblies 8 (FIGS. 2 and 3). The fuel assembly 8 (FIG. 3) comprises a casing 9 having a head 10 and a tail 11. The casing 9 and head 10 are shaped as a prism having six sides. In the embodiment under review, the prism is hexahedral.

Figure 5:
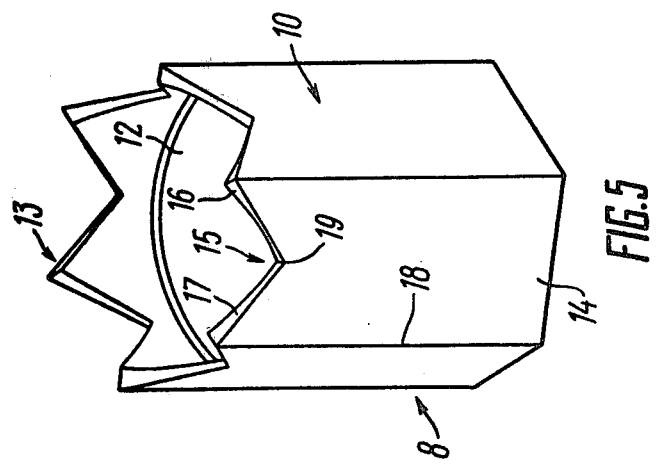
FIG. 5 is an axonometric view of the head of FIG. 4.

Each fuel assembly head 10 (FIG. 4) is provided with an internal groove 12. End faces 13 (FIG. 5) of faces 14 of each head 10 are provided with recesses or cutouts 15. The number of the recesses 15 is equal to the number of fuel assemblies 8 adjacent to the one being handled (i.e. a fresh or spent fuel assembly 8'). In the embodiment under review, there are six recesses 15. Sides 16 and 17 (FIG. 5) of the recesses 15, thereby defining six teeth or points are symmetrical with respect to edges 18 of the faces 14 of the head 10 of the fuel assembly 8. A line 19 of intersection of the sides 16 and 17 extends radially relative to the longitudinal axis of the fuel assembly 8.

Built into the rotating plug 3 (FIG. 1) is a refuelling device 20 intended to remove spent fuel assemblies from the reactor core A and install fresh fuel assemblies instead. Being installed in the plug 3, the device 20 can handle, due to the travel of plug 3 over the plug 2, that part of the fuel assemblies 8 (FIG. 2) which is arranged in the core A under the plug 3; as the plug 2 moves over the end face of the vessel 1, the device 20 can take care of the remaining fuel assemblies 8 (FIG. 2) which are under the plug 2 (FIG. 1).

The refuelling device 20 comprises a housing 21 secured on the rotating plug 3, a guide member 22 and a gripping means 23 (FIG. 6) accomodated in the guide member 22. The guide member 22 has an end face 24 shaped as a truncated cone whose vertex is directed towards the head 10 of the fuel assembly 8' being handled. The guide member 22 performs reciprocating motion with the aid of a drive 25 (FIG. 1) mounted on the housing 21. The drive 25 is of the conventional design known to those skilled in the art.

Figure 7:
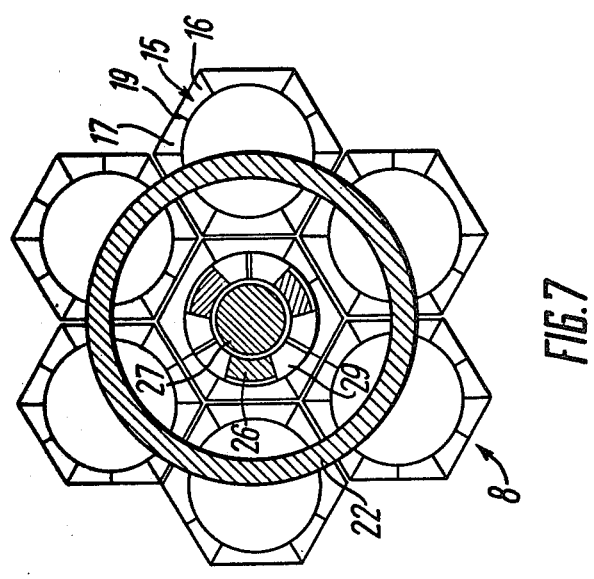
FIG. 7 is a section taken on line VII—VII of FIG. 6.

The gripping means 23 (FIG. 6) comprises two bars, i.e. an external bar 26 and an internal bar 27. The external bar 26 carries a working member mounted thereon with the aid of joints 28. The working member comprises jaws 29 (FIG. 7) arranged at an angle of 120° relative to each other. When engaging the fuel assembly 8' being handled, protrusions 30 of the jaws 29 (FIG. 6) are received in a groove 31 provided in the internal bar 27; other protrusions 32 of the jaws 29 are received in the internal groove 12 of the head 10 of the fuel assembly 8' being handled.

In the reactor core A (FIG. 2), the fuel assemblies 8 are so arranged with respect to the fuel assembly 8' being handled that the sides 16 (hatched) of the recesses 15 next to the recess 15' adjacent to the recess 15" of the fuel assembly 8' being handled face the fuel assembly 8' being handled and all form parts of the surface of a truncated cone 33 whose axis is matched with the longitudinal axis of the fuel assembly 8' being handled.

The diameter of the lesser base of the truncated cone of the guide member 22 (FIG. 6) is greater than the diameter of the lesser base of the truncated cone 33 partially formed by the sides 16 of the recesses 15 facing the fuel assembly 8' being handled, but less than the diameter of its greater base.

The proposed nuclear reactor is refuelled as follows.

In the course of the reactor's operation the nuclear fuel is spent and there arises the necessity of replacing the spent fuel assemblies 8' (FIG. 2) by fresh ones. This neccesitates a shutdown of the reactor. As the reactor is shut down, the spent fuel assemblies are removed from the reactor core A (FIG. 1) to the storage 7; new fuel assemblies are installed in their places. For this purpose, the refuelling device 20 is appropriately oriented with the aid of the rotating plugs 2 and 3 relative to the fuel assembly 8' (FIG. 2) to be handled.

The spent fuel assemblies 8' are transferred like this. The drive 25 lowers the guide member 22 (FIG. 1) so that it is found above the end faces of the heads 10 (FIG. 3) of the fuel assemblies 8. To grip a fuel assembly, the gripping means 23 (FIG. 6) and the bars 26 and 27 move down. As this takes place, the internal bar 27 enters the head 10 of the fuel assembly 8' to be handled.

As the guide member 22 and the external bar 26 simultaneously assume their lowermost positions, the jaws 29 grip the fuel assembly 8'. As this takes place, the protrusions 30 of the jaws 29 are received in the groove 31 of the internal bar 26, while the protrusion 32 is received in the internal hollow 12 of the fuel assembly 8'. Thus the fuel assembly 8' is gripped. The guide member 22 goes down to be received in the recesses 15 of the fuel assemblies adjacent to the fuel assembly 8' being handled. The diameter of the lesser base of the truncated cone of the guide member 22 is greater than the diameter of the lesser base of the truncated cone 33 partially formed by the sides 16 of the recesses 15; as a result, the fuel assemblies 8 adjacent to the one being handled are moved aside, which facilitates the removal of the fuel assembly 8' being handled. The adjacent fuel assemblies 8 are firmly held in place and prevented from being withdrawn with the fuel assembly 8' being removed.

Figure 6:
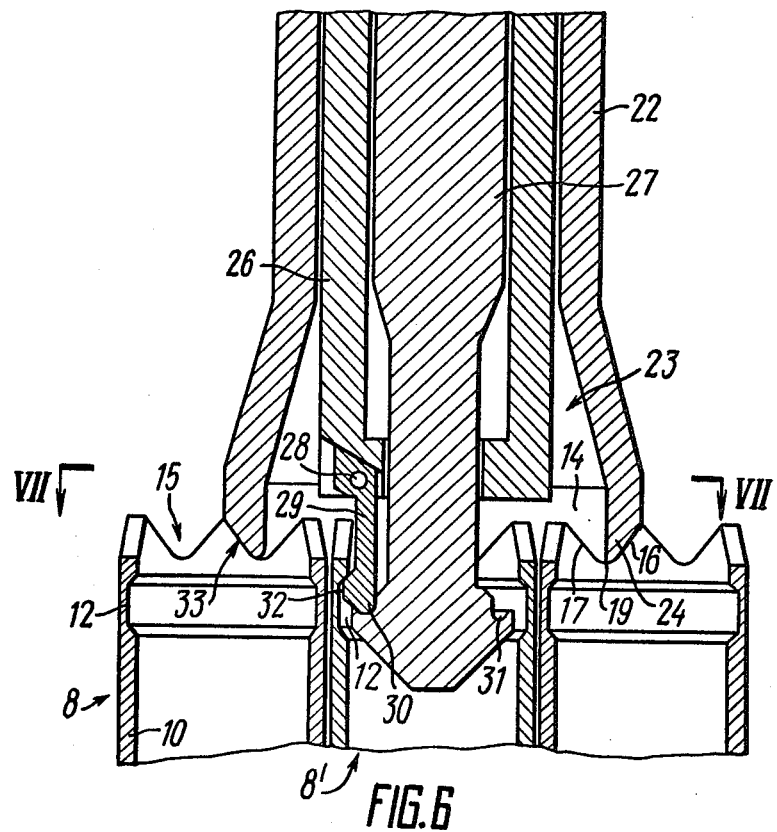
FIG. 6 is an elevation view of fuel assemblies and a part of the refuelling device, taken at a moment the jaws of the gripping means engage one of the heads.

To remove the fuel assembly 8', the gripping means 23 is raised by the drive 25 (FIG. 1) with the fuel assembly 8' being handled (FIG. 6). The upward movement of the gripping means 23 stops when the tail 11 (FIG. 3) of the fuel assembly 8' (FIG. 6) being handled rises above the level of the heads 10 of the adjacent fuel assemblies 8. The drive 25 (FIG. 1) then raises the guide member 22. The rotating plugs 2 and 3 then transfer the fuel assembly 8' to the storage 7, wherefrom it is subsequently removed by an unloading mechanism (not shown).

A new fuel assembly is installed as follows. The drive 25 brings the guide member 22 down to the stop. As this takes place, the end face 24 (FIG. 6) is received in the recesses 15 of the fuel assemblies 8 adjacent to the one being handled, whereby the refuelling device 20 (FIG. 1) is centered with respect to the socket where the fuel assembly 8' (FIG. 6) being handled is to be installed, whereas the adjacent fuel assemblies 8 are moved aside. The drive 25 then lowers the gripping means 23 with the fuel assembly 8' being handled. When the fuel assembly 8' is installed in place, the gripping means 23 stops. As the guide member 22 moves up, the jaws 29 of the gripping means loosen their grip; as this takes place, the external bar 26 goes up, and the jaws 29 leave the groove 12 of the head 10 of the fuel assembly 8' being handled. The drive 25 then raises the internal bar 27. The refuelling device 20 is brought to its initial state.

The interaction between the guide member 22 and the recesses 15 of the heads 10 of the fuel assemblies 8 improves the operating reliability of the refuelling device 20 and the nuclear reactor as a whole; it makes it possible to increase the flow area for the coolant in the heads 10 of the fuel assemblies 8 and also makes it possible to use a tougher working member for the gripping means 23.

What is claimed is:

1. An improved nuclear reactor of the type having
    a vessel;
    a coolant filling said vessel;
    a core accommodated in said vessel;
    a plurality of fuel assemblies accommodated in said core, wherein said fuel assemblies are intended to be handled and transferred and have a longitudinal axis; the improvement
    wherein the heads of said fuel assemblies are formed, each having an internal hollow, said heads being shaped as prisms comprising faces and edges, said faces having end faces;
    a refuelling device intended to transfer said fuel assemblies, mounted on said vessel, said refuelling device comprising a tubular guide member having a circular cross-section mounted on said vessel, said tubular guide member having a tapered end face shaped as a truncated cone having a vertex facing toward said head of said fuel assembly to be handled, a gripping means arranged in said guide member and having an end face, a working member secured on said end face of said gripping means, a drive mechanically coupled to said gripping means and said guide member to set them in motion;
    said end faces of said heads of said fuel assemblies being provided with a plurality of cutouts each having first sides and second sides, the number of said plurality of cutouts being equal to the number of fuel assemblies adjacent to said fuel assembly to be handled and defining an equal number of upraised teeth, said cutouts being arranged symmetrically with respect to said edges of said faces of said heads and the apices of said teeth being located at the edges of said heads;
    the sides of said cutouts facing said fuel assembly being handled in each one of said fuel assemblies adjacent to said fuel assembly being handled, all forming parts of the surface of a second truncated cone coaxial with the longitudinal axis of the fuel assembly being handled; and the vertex of said second truncated cone facing away from the head of the fuel assembly being handled, wherein prior to the handling and transferring operation the diameter of the lower circular edge of said first truncated cone of said guide member is greater than the diameter of an imaginary circle which is formed by the intersection of said sides of said cutouts facing said fuel assembly being handled, whereby the fuel assemblies adjacent to the one being handled are moved aside by cooperation of said first and second truncated cones and are held in position and prevented from vertical displacement.

* * * * *